Dec. 16, 1958  H. E. HRUSKA  2,864,340
POWER STEERING APPARATUS
Filed Oct. 3, 1951  2 Sheets-Sheet 1
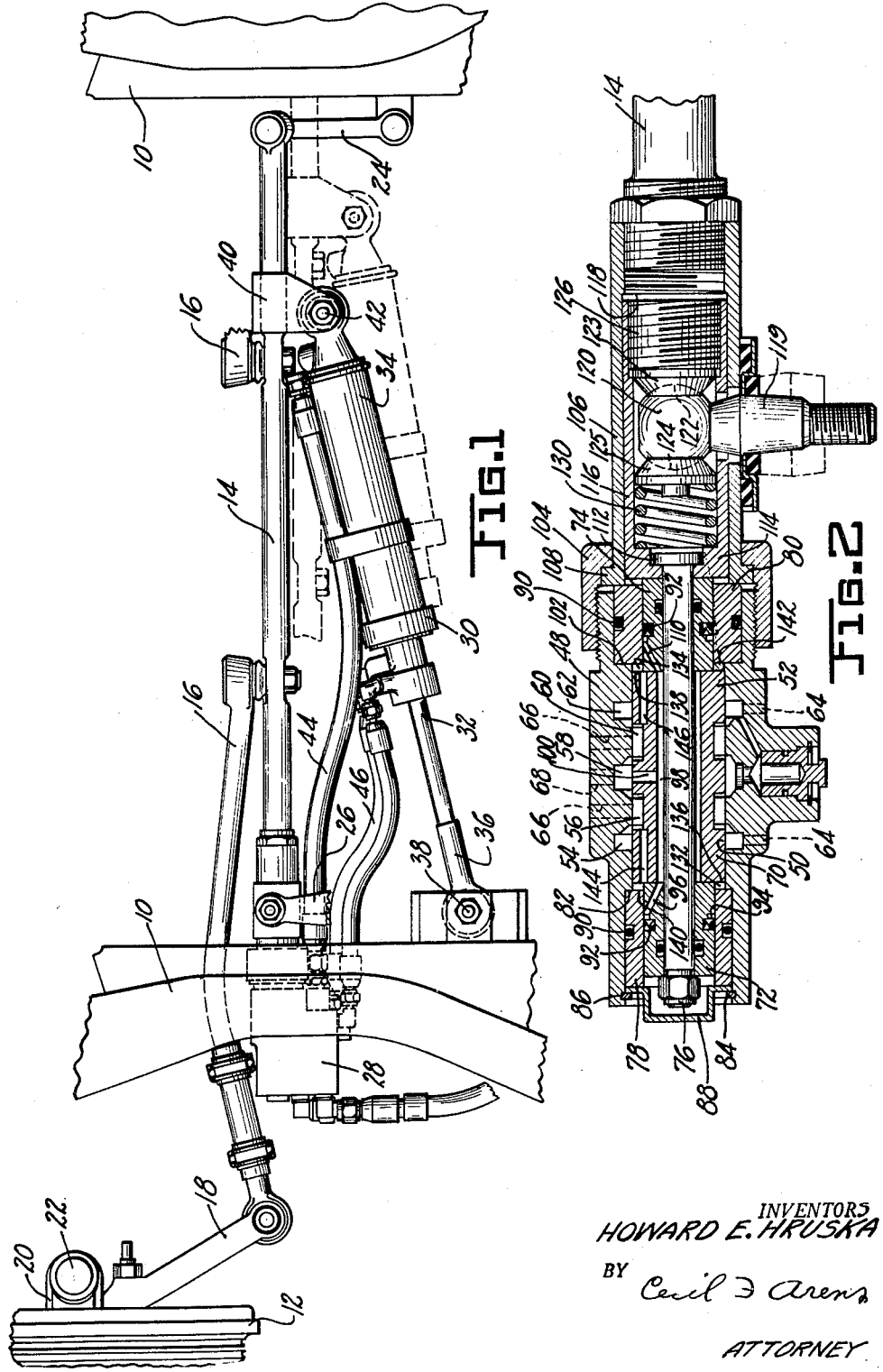
INVENTORS
HOWARD E. HRUSKA
BY Cecil J Arens
ATTORNEY

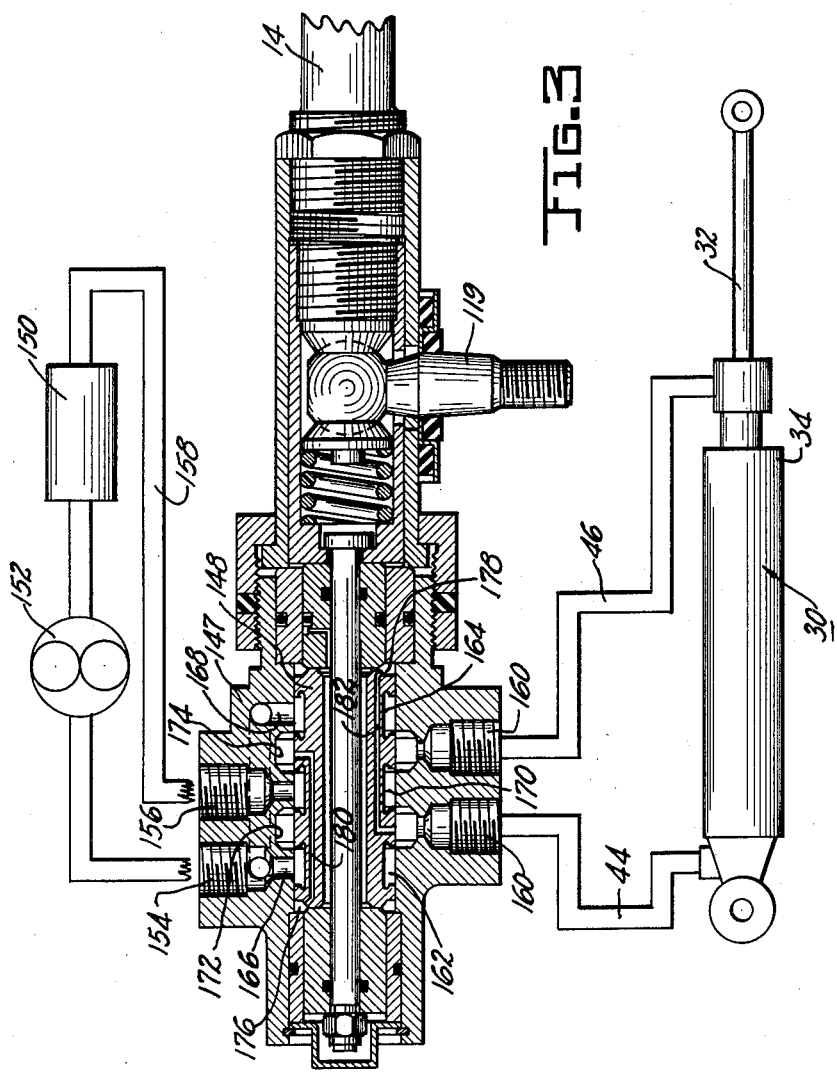

United States Patent Office 2,864,340
Patented Dec. 16, 1958

2,864,340

POWER STEERING APPARATUS

Howard E. Hruska, South Bend, Ind., assignor to Bendix Aviation Corporation, South Bend, Ind., a corporation of Delaware Application October 3, 1951, Serial No. 249,593

8 Claims. (Cl. 121—46.5)

This invention concerns power steering for vehicles and more particularly hydraulic power-steering.

It is an object of the invention to provide a valve for use in a hydraulic system to establish a reaction force which is utilized as an aid to steer a vehicle manually.

A further object of the invention resides in the provision of a valve for use in a hydraulic system to manually establish a reaction force which is combined with power assist to accomplish steering of a vehicle.

Another object of the invention resides in the provision of a hydraulic power steering apparatus comprising a valve and fluid motor wherein the valve is capable of establishing a hydraulic reaction force which bears a relationship to the fluid pressure acting in the motor.

A still further object is to provide an efficient and simplified hydraulic power steering apparatus.

The above and other objects and features of the invention will be apparent from the following description of the apparatus taken in connection with the accompanying drawings which form a part of this specification, and in which:

Figure 1 is a schematic view of the steering apparatus;

Figure 2 is a view in section of the valve used in the apparatus of Figure 1; and Figure 3 is a schematic representation of a modified form of the invention showing its connections to a hydraulic system.

Referring now to Figure 1 of the drawings the reference numeral 10 designates a vehicle chassis on which the apparatus of the invention is supported. The chassis 10 is carried on wheels 12, only one of which is shown. The vehicle is equipped with the usual steering linkage comprising a cross tie rod 14, side links 16, connecting the tie rod to steering arms 18, only one of which is shown, a wheel spindle 20, integrally related to the steering arm, and a king pin 22, carried by the wheel spindle for pivotally supporting the steered part or wheel 12. One end of the cross tie rod 14 is supported on the chassis by an idler link 24, the other end of the tie rod is supported from a pitman arm 26, drivably related to a steering column and wheel, not shown, for manually steering a vehicle.

To accomplish power steering a control valve 28 is interposed in the linkage between the cross tie rod 14 and the pitman arm 26, for controlling the flow of fluid under pressure to a fluid motor 30, embracing piston and cylinder elements 32 and 34 respectively, which divide the motor into opposed chambers, not shown. The piston element 32 is connected to the chassis by a link 36 and bolt 38 which permits the motor to swing in the plane of the paper. The cylinder element 34 is attached to the cross tie rod 14 by any suitable means, such as bracket 40. The cylinder element is free to swing about bolt 42, which passes through the bracket. Connections 44 and 46 provide for the transfer of fluid under pressure from the control valve to the opposed chambers of the fluid motor.

The control valve 28 comprises a housing 48, provided with a bore 50, having a valve member 52 therein slidably positionable in opposite directions from a normally central position as shown in Figure 2, for controlling flow to the fluid motor. The valve member 52 and cylinder bore 50 are formed with annular channels 54, 56, 58, 60 and 62. The channels 56 and 60, located in the valve member 52, are of such width that free communication between the channel 58 and the channels 54 and 62 is established with the valve member in its neutral or central position. The channels 54 and 62 are in communication with inlet ports 64. The channels 56 and 60 are connected to working ports 66, and the channel 58 is connected to a reservoir port 68. The valve member 52 comprises the mid-section 70, and end sections 72 and 74 held in assembled relationship by a bolt 76.

The ends of the housing 48 are provided with bushings 78 and 80 for receiving the end sections 72 and 74 respectively. The bushing 78 has its inner end abutting shoulder 82 and its outer end held against a split washer 84 retained in a groove 86, of the housing bore. The left end of the bore is closed by a hat shaped cover 88 having its brim interposed between bushing 78 and the split washer 84. A seal 90 prevents leakage to atmosphere from between bushing 78 and the housing 48. A V-shaped packing ring 92 is received in groove 94 and wipes the interior of the bushing 78. This packing ring 92 prevents leakage between the parts 72 and 78. The reservoir port 68 is communicated to the inner side of the V-shaped packing ring 92 via passage 96, annular passage 98, and radial passage 100, thus providing lubrication for the end sections of the valve member and a leakage return path to the reservoir. The bushing 80 is held against shoulder 102 by an external cap 104 which threadedly engages the housing 48. The housing is provided with an extension in the form of a tube 106 having a flange portion 108 turned outwardly for interposing between the cap 104 and the bushing 80. Bushing 80, like bushing 78, is equipped with a seal 90 to prevent leakage to atmosphere. Section 74 is also provided with a V-shaped packing ring 92 which wipes the interior of the bushing 80 and prevents leakage between parts 74 and 80 to atmosphere. The inner side of the packing ring 92, associated with the end section 74, is communicated to the reservoir port 68 via passage 110, the annular passage 98, and the radial passage 100. The right end of the bolt 76 is formed with an enlarged head 112 for engagement with an end 114 of a sleeve 116, slidably disposed in the tubular extension 106 of the housing 48. The sleeve 116 can slide in the housing between the end of the bushing 80 and a shoulder 118 in the tube 106. The bolt 76, ties the sections 70, 72, 74 and the sleeve 116 together for movement as a single member or unit. The tube 106 and the sleeve 116 are provided with lateral openings for the reception of a ball stud 119, one end of which is connected to the pitman arm 26. The other end of the ball stud is formed with a rounded portion 120 which is carried in sockets 122 and 124 of members 123 and 125 respectively, located in the sleeve 116. A plug 126 is threaded into the open end of sleeve 116 and is adjustable to preload a spring 130, interposed between the opposite end 114 of the sleeve and the member 125. The spring 130 is sufficiently heavy to provide a relatively rigid connection between the valve member 52 and the manual steering means. As parts 120, 123, and 125 become worn the spring expands an amount equal to the total wear of the parts. The cross tie rod 14 threadedly engages the tubular end of the housing 48.

Aside from the general arrangement of the valve and steering apparatus the control valve of the invention is also provided with novel means for creating a differential in pressure on the ends of the valve member 52 upon movement thereof from its central position, for causing the housing member to follow up the valve member. This means includes chambers 132 and 134 connected to the annular channels 56 and 60 respectively. The annular areas 136 and 138 of the valve member 52 form one movable wall for each of the chambers 132 and 134, and the opposing annular areas 140 and 142, of the housing member 48, form another movable wall for each of the aforesaid chambers. The chambers 132 and 134 are connected respectively, to the annular channels 56 and 60 by passages 144 and 146.

Figure 3 is a modification of the control valve of Figure 2. The principal difference between the control valves resides in the construction and arrangement of the annular channels and to this end only, will the valve be described. In the description of Figure 3, all parts like those in Figures 1 and 2 will be given the same designating numeral. The valve comprises a housing member 147 and a valve member 148 disposed in the bore of the housing and movable in opposite directions from a central position for controlling flow. Fluid from a reservoir 150 is pressurized by a pump 152, which is connected to an inlet port 154 of the valve. A reservoir port 156 communicates with the reservoir 150 via pipe line 158. Two working ports 160 communicate with opposite ends of the fluid motor 30 through the flexible connections 44 and 46. The valve member 148 is formed with annular channels 162 and 164 which communicate with the inlet port through passages 166 and 168 respectively. An annular channel 170 is also located in the valve member, between channels 162 and 164, and communicates with the reservoir port 156. Annular channels 172 and 174, formed in the bore of the housing member 147, are of such width that each overlaps equal areas of the annular channels 162 and 170 and 164 respectively when the valve is in its central position. Annular chambers 176 and 178 are located at the ends of the valve member 148 between the latter and the housing member 147. These chambers 176 and 178 are connected to the working port channels 172 and 174 through passageways 182 and 180 respectively. Functionally, this control valve is identical with that of Figure 2, except that structurally the former might be considered as turned inside out. That is, the annular channels of the valves of Figures 2 and 3 are in different members.

Operation and function of the steering apparatus:

With the control valve in its central position, of Figures 1 and 2 which is the case during nonsteering, fluid under pressure from the source divides equally between the inlet ports 64, from whence the fluid flows to the reservoir port 68 via the annular channels 56 and 60. The fluid under pressure which flows through the annular channels 56 and 60 also acts in the ends of the fluid motor 30 through the connections 44 and 46. At this time the pressures in chambers 132 and 134 are equal and since the opposing areas 136 and 140 of the chamber 132 and the areas 138 and 142 of the chamber 134 are equal the resultant forces acting on these areas cancel out.

Movement of the valve member 52 from its central position reduces the flow in one of the working ports 66 and increases flow in the other working port. For example, movement of the valve member 52 to the right, Figure 2, restricts the flow to the annular channel 56 and to working port 66, on the left, and increases the flow to the annular channel 60 and hence to the working port 66, on the right. This action of the valve connects one side of the fluid motor to the increase in flow from the working port on the right, and the other side of the motor to the reservoir port 68, through the widened overlap between the annular channels 56 and 58, causing movement of the steered part 12. Since the housing of the control valve and the cylinder of the fluid motor are connected to the cross tie rod, movement of the steered part also returns the valve to its central position. That is, the steering apparatus is of the follow-up type. Since the chamber 132 is communicated to the working port 66 on the left through the passage 144 and the chamber 134 is communicated to the working port 66 on the right through the passage 146 the latter mentioned chamber will be subjected to a greater pressure. Bearing in mind that the areas of the movable walls are the same in both chambers, the movable walls of the chamber having the greater pressure will be subjected to a force proportional to the differential in pressure existing in the two chambers, tending to restore the valve to its central position. This reaction force which is transmitted into the housing member 48 is combined with the force applied to the tie rod through the action of the fluid motor, to thereby steer the vehicle. A force equal and opposite to this reaction force is imparted to the right end of the valve member tending to prevent further movement thereof. This force, which is taken in the valve member, is felt by the operator of the vehicle and is called "feel." This "feel" has the effect of apprising the operator of the effort required to steer and may be varied by selecting other areas for the movable walls.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

1. A valve comprising a housing with a cylindrical bore therein, a cylindrical valve member having a central position in the bore and slidably positionable from said central position for controlling flow, said housing being movable with respect to said valve member to reestablish the latter in its central position in the bore, two annular channels in the bore of the housing connectible to a source of fluid under pressure, a third annular channel in the bore of the housing connectible to a return line, two annular channels in the valve member connectible to working ports and communicating the third annular channel with the other annular channels in the bore of the housing, pressure chambers formed in the ends of the bore between the housing and the valve member, each of said pressure chambers being provided with two opposed reaction areas one associated with the housing and the other associated with the valve member, connections from said pressure chambers to the working ports via the two annular channels in the valve member, movement of said valve member away from its central position establishing unequal pressures in the chambers acting on said areas tending to cause the housing to follow up the valve member, and means for moving said valve member out of its central position.

2. A valve comprising a housing with a cylindrical bore therein, a cylindrical valve member having a central position in the bore and slidably positionable from said central position for controlling flow, said housing being movable with respect to said valve member, two annular channels in the bore of the housing connectible to a source of fluid and spaced apart axially along the bore, a third annular channel in the bore of the housing connectible to a return line and located between said two annular channels, two annular channels in the valve member connectible to working ports, said two last mentioned annular channels being so arranged in said valve member and of such a width that when the valve member is in its central position one of said last mentioned annular channels communicates one of said first mentioned annular channels with said third annular channel and the other of said last mentioned annular channels communicates the other of said first mentioned annular channels with said third annular channel, a chamber formed at each end of the valve member between the latter and the housing, said valve member forming one movable wall for the chambers and the housing forming the other movable wall, a passage from one of the chambers to one of the two last mentioned annular channels, a passage from the other chamber to the other of said last mentioned annular channels, movement of said valve member from its central position establishing unequal pressures in said chambers acting on said movable wall formed by the housing tending to cause the housing to move in a direction to re-establish the valve member in its central position, and means for moving said valve member away from its central position.

3. A valve for a servo motor comprising a housing member, a valve member mounted in said housing member and shiftable from a neutral position for controlling flow, a pair of annular inlet channels adapted to receive a working fluid under pressure, an outlet port and a pair of working ports, expansible chambers adjacent the opposite ends of the valve member, said chambers each having opposed movable walls defined by the contiguous surfaces of the housing and valve members, two annular channels connecting the inlet channels to the working ports and also to the outlet port, fluid connections formed in one of said members from each of said chambers to the working ports via said two annular channels, movement of said valve member from its neutral position producing a differential in pressures in said working ports which differential pressures are communicated through the respective connections to the expansible chambers, the resultant differential in pressures in said expansible chambers exerting a reaction force on the opposed movable walls thereof defined by the housing and valve members in a direction tending to move the valve to its neutral position.

4. A valve for a servo motor comprising a housing member, a valve member mounted in said housing member and shiftable from a neutral position for controlling flow, a pair of annular inlet channels formed in said housing member, means for communicating a working fluid under pressure to said channels, an outlet or reservoir port and a pair of working ports also formed in said housing member, expansible chambers adjacent the opposite ends of the valve member, said chambers each having opposed movable walls defined by the contiguous surfaces of the housing and valve members, annular channels formed in the housing and valve members and connecting the inlet channels to the working ports and also to the outlet or reservoir port, fluid connections formed in said valve member from each of said chambers to the working ports via said annular channels, movement of the valve member from its neutral position producing a differential in pressures in said working ports which differential pressures are communicated through the respective connections to the opposed expansible chambers, the resultant differential in pressures in said expansible chambers exerting a reaction force on the opposed movable walls thereof in a direction tending to move the valve member to its neutral position.

5. A valve assembly for use in a power steering system, said valve including a housing member with a cylindrical bore therein, a cylindrical valve member having a neutral position in said bore, said housing and valve member reciprocably associated with each other so each is movable with respect to the other to control fluid pressure, two spaced annular channels in said bore adapted to communicate with fluid pressure ports, a third annular channel in said bore in between said two spaced annular channels and adapted to communicate with an outlet fluid port, a pair of annular channels in said valve member each adapted to communicate with a work port, each of said annular channels in said valve member adapted to be located between one of the annular channels adapted to communicate with a fluid pressure port and the annular channel adapted to communicate with an outlet port when said valve member is in a neutral position, all of the channels adapted to be in direct fluid communication when said valve member is in a neutral position, expansible pressure chambers located between the ends of the valve member and portions of the housing, each pressure chamber including two opposed reaction areas, one associated with the housing and the other with the valve member, means providing direct fluid communication between one of the annular channels adapted to communicate with a work port and one of the pressure chambers, and means associated with said valve assembly to move the housing and valve member with respect to each other whereby movement therebetween causes unequal pressures in the pressure chambers which act upon the reaction areas tending to cause relative movement between the housing and valve member to return them to a neutral position.

6. A valve assembly for use in a power steering system, said valve comprising a housing member with a cylindrical bore, a reciprocable valve member in said bore, said housing and valve member each movable with respect to the other to control fluid pressure, a pair of fluid pressure inlet ports in said housing in communication with two annular channels in the bore of said housing, a return port in said housing between said two inlet ports in communication with a third annular channel in the bore of said housing which is located between said two annular channels therein, two work ports in said housing in communication with a pair of annular channels in said reciprocable valve member, each of which is adapted to be located between one of the annular channels in communication with fluid pressure and the annular channel in communication with the outlet port, all of the annular channels being in direct fluid communication when said valve member is in a neutral position, expansible pressure chambers located at the ends of the reciprocable valve member between the end of the valve member and the housing, each expansible pressure chamber including two opposed reaction areas, one associated with the housing and the other with the valve member, a direct fluid communication between each expansible pressure chamber and an adjacent annular channel in the valve which is in communication with a work port, and means associated with said valve assembly to move the relatively movable housing and valve members with respect to each other, whereby when the relatively movable members are moved with respect to each other fluid pressure is directed to one of said work ports and is cut off from the other work port, and the fluid pressure directed from said one work port is also directed to the expansible pressure chamber in direct fluid communication therewith, said expansible chamber having been made smaller in proportion to the movement of the relatively movable housing and valve member; the fluid pressure being directed to said expansible chamber causing a reaction to be transmitted to an operator of the steering system and reacting against the reaction areas in the expansible pressure chamber tending to cause relative movement between the housing and valve member to return them to a neutral position.

7. A valve comprising inner and outer telescopically arranged members having normally neutral positions with respect to each other, one of said members being shiftable from either direction from its neutral position for controlling flow, an inlet port, an outlet port, two working ports, channels in the members communicating with the respective ports and establishing communication therebetween, two chambers, one located at each end of said inner member, the channels in the inner member being provided by a plurality of lands, said plurality of lands including two lands, one located at each end of said inner member adjacent the respective chambers and forming movable walls therefor, passages in the lands forming the movable walls, said passages connecting the chambers to channels in communication with the two working ports, and means for moving said one member from its neutral position.

8. A valve comprising inner and outer telescopically arranged members having normally neutral positions with respect to each other, one of said members being shiftable from either direction from its neutral position for controlling flow, an inlet port, an outlet port, two working ports, channels in the members communicating with the respective ports and establishing communication therebetween, two chambers, one located at each end of said inner member, the channels in the inner member being provided by a plurality of lands, said plurality of lands including two lands having passages therein connecting said two chambers to channels which are in communication with said two working ports, and means for moving said one member from its neutral position.

References Cited in the file of this patent

UNITED STATES PATENTS

| | | |
|---|---|---|
| 2,000,805 | West et al. | May 7, 1935 |
| 2,022,698 | Vickers | Dec. 3, 1935 |
| 2,140,037 | Swisher | Dec. 13, 1938 |
| 2,210,916 | Kenyon et al. | Aug. 13, 1940 |
| 2,256,970 | Bryant | Sept. 23, 1941 |
| 2,345,531 | De Ganahl | Mar. 28, 1944 |
| 2,380,705 | Proctor | July 31, 1945 |
| 2,393,585 | Boynton | Jan. 29, 1946 |
| 2,427,340 | Allison | Sept. 16, 1947 |
| 2,432,721 | Brown | Dec. 16, 1947 |
| 2,450,126 | Fisher | Sept. 28, 1948 |
| 2,487,618 | Tuyman | Nov. 8, 1949 |
| 2,565,929 | Onde | Aug. 28, 1951 |
| 2,608,263 | Garrison | Aug. 26, 1952 |